United States Patent [19]
Cady

[11] 3,739,202
[45] June 12, 1973

[54] INSTRUMENT FOR RESPONDING TO MECHANICAL VIBRATION OF ACCELERATION AND FOR CONVERTING THE SAME INTO ELECTRIC ENERGY

[76] Inventor: Walter G. Cady, 127 Power Street, Providence, R.I. 02906

[22] Filed: Aug. 28, 1970

[21] Appl. No.: 68,052

Related U.S. Application Data

[63] Continuation of Ser. No. 496,346, Oct. 15, 1965, abandoned, which is a continuation of Ser. No. 785,068, Dec. 17, 1968, abandoned.

[52] U.S. Cl. .................. 310/8.3, 310/8.4, 310/8.6, 310/8.7, 310/9.1, 340/17, 73/503, 73/517
[51] Int. Cl. ............................................ H04r 17/00
[58] Field of Search ...................... 310/8, 8.2–8.8, 310/9.1–9.4, 9.8; 340/17; 73/503, 517

[56] References Cited
UNITED STATES PATENTS

| | | | |
|---|---|---|---|
| 3,584,243 | 6/1971 | Fabian | 310/8 |
| 3,283,590 | 11/1966 | Shang | 310/8.4 UX |
| 2,638,556 | 5/1953 | Hausz | 310/8.4 |
| 2,963,911 | 12/1960 | Courtney-Pratt et al. | 310/8.4 X |

OTHER PUBLICATIONS

Standards on Piezoelectric Crystals, proceedings of the I.R.E., Dec. 1949, pp. 1378–1395.

Piezoelectricity, W. G. Cady, Dover Publications, N.Y., 1964 Chapters 2, 3, 8 and 9.

Primary Examiner—D. F. Duggan
Assistant Examiner—Mark O. Budd
Attorney—Rines and Rines

[57] ABSTRACT

An instrument for responding to mechanical vibration or acceleration of a base comprising two piezoelectric or other suitable oppositely disposed normally unstrained electromechanical vibrators the outer ends of which are fastened to opposite parts of the base and the inner ends to an inertial member, which inner ends become simultaneously moved in substantially a single direction only, relatively to the base, in response to vibration or acceleration of the base in an opposite direction. In the case of piezoelectric crystals, the properties of shear or of compression can be utilized.

11 Claims, 12 Drawing Figures

Patented June 12, 1973

Inventor
Walter G. Cady
by Rines and Rines
Attorneys

Inventor
Walter G. Cady
by Rivers and Rivers
Attorneys

Inventor
Walter G. Cady
by Rines and Rines
Attorneys

Inventor
Walter G. Cady
by *Attorneys*

INSTRUMENT FOR RESPONDING TO MECHANICAL VIBRATION OF ACCELERATION AND FOR CONVERTING THE SAME INTO ELECTRIC ENERGY

CROSS-REFERENCE TO RELATED APPLICATIONS

The present application is a continuation of Ser. No. 785,068, filed Dec. 17, 1968, which is a continuation of Ser. No. 496,346, filed Oct. 17, 1965. Both are now abandoned.

BACKGROUND OF THE INVENTION

1. The Field of The Invention

The present invention relates to instruments for responding to mechanical vibration or acceleration. The invention relates also to instruments for converting the mechanical vibration of vibrator or sensing elements into electric energy. The invention may be used, for example, to detect or measure the mechanical vibration or acceleration of any structure, such as an airplane, to which the vibrator elements are attached.

2. Description of the Prior Art

Instruments of the prior art have operated upon the principle of two oppositely disposed electromechanical vibrators the outer ends of which are fastened to opposite parts of the base and the inner ends to an inertial member. These prior-art instruments have taken advantage of various laws of physics, including piezoelectricity and piezoresistance. The use of such instruments, however, has been limited by such difficulties as great complication and fragility.

An object of the invention is to provide a new and improved instrument of the above-described character employing a plurality of vibrator or sensing elements that are mounted upon a base so as to be independently responsive to or measure or detect mechanical vibration or acceleration of the base whether in one, two or three directions at right angles to one another. Another object is to provide a new and improved instrument of the above-described character that shall be simple and rugged.

Still another object is to provide a new and improved instrument of the above-described character the vibrator or sensing elements of which are constituted of piezoelectric material, which is particularly adapted for the production of both compressional and shearing effects.

It is another object of this invention to avoid disturbing effects due to flexure by providing piezoelectric elements in the form of blocks sufficiently thick to prevent appreciable flexure.

It is another object of this invention to provide piezoelectric elements that shall respond to acceleration or vibration in one direction only.

Still another object is to provide a new and improved piezoelectric instrument of the above-mentioned character, each sensing element of which shall respond to mechanical vibration or acceleration in one direction only, while being substantially unresponsive to vibration or acceleration in any other direction.

It is still a further object of the invention to provide a new and improved piezoelectric instrument of the above-mentioned character of very small size.

Other and further objects will be explained hereinafter and will be particularly pointed out in the appended claims.

SUMMARY OF THE INVENTION

With the above objects in view, according to one embodiment of the invention, two oppositely disposed mechanical vibrator or sensor elements of particular characteristics are employed, the outer ends of which are fastened to opposite parts of the base. An inertial member is fastened to their inner ends. The construction and orientation or other positioning of the vibrator or sensing elements is such that they becomes strained so as to vibrate in substantially a particular direction only, thereby to respond electrically to vibration or acceleration of the base in substantially the same particular direction.

According to further embodiments of the invention, four or six such mechanical vibrator or sensing elements may be employed, arranged in pairs at mutually perpendicular direction of one another, for the purpose of effecting the same or similar results in two or three mutually perpendicular planes.

BRIEF DESCRIPTION OF THE DRAWINGS

The invention will now be described more fully in connection with the accompanying drawings, in which.

DESCRIPTION OF THE INVENTION

Figure 1:
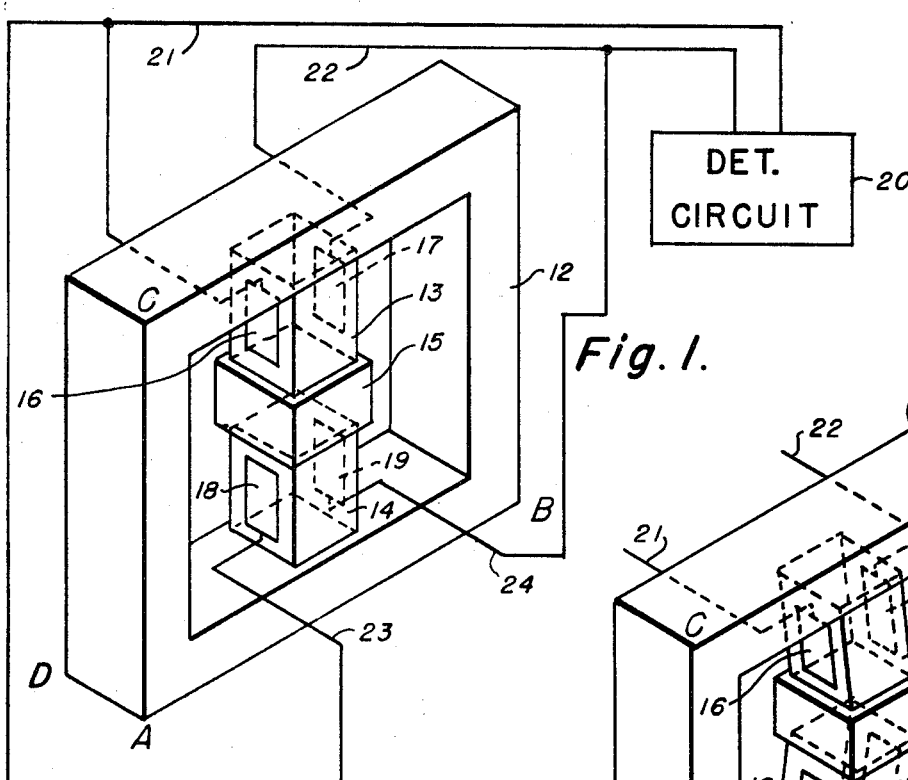
FIG. 1 is a schematic isometric view of a device embodying the present invention, comprising a base to which are fastened, in accordance with the present invention, two preferred piezoelectric-crystal vibrators or sensing elements, with an inertial member interposed between them, the parts being shown in their normal position of rest.
Figure 2:
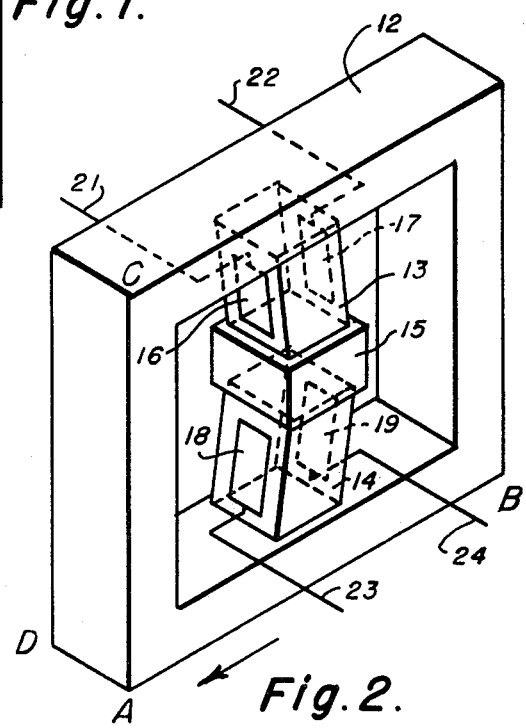
FIG. 2 is a similar view, showing the parts in a state of strain.

Referring first to the embodiment of the invention that is illustrated by FIGS. 1 and 2, a base 12 is shown as a rigid rectangular frame, which may be rigidly secured to, or may be incorporated in, an airplane or other vibratory or accelerating object. Two oppositely alined vibratory or sensing elements, shown in the form of relatively thick blocks 13 and 14 of piezoelectric material, having inner (relatively adjacent) surfaces and outer (relatively remote) surfaces, may each be attached or fastened rigidly, as by cement, at their outer surfaces, to oppositely disposed parts of the base 12. An inertial member 15, which may, for example, be constituted of a metal slab, is shown similarly attached or fastened to the oppositely disposed inner surfaces of the blocks 13 and 14.

The blocks 13 and 14 may be constituted of bars of parallelpiped shape, square or rectangular in cross-section, with the length of each block 13 and 14 preferably, though not necessarily, larger than its other dimensions. In order that substantially all the mechanical energy shall be in the form of shear or compression, rather than flexure, the thickness of each block should be at least about a third of its length.

In the specification and claims, the following conventions will be used: the word "length" will signify the dimension of the vibrator along the line connecting the outer ends of the vibrators; the word "thickness" will signify the direction of the electric field, along the axis connecting the electrodes; and the word "breadth" will signify the direction at right angles to length and thickness. In the case of a vibrator provided with two pairs of electrodes, as for example in FIG. 3, the direction that is called thickness with respect to one pair of electrodes becomes the breadth for the other pair.

In the drawings, the lengths of the blocks 13 and 14 are shown as the direction in which they are shown alined, normal to the two surfaces of the frame 12 to which they are shown attached.

A pair of oppositely disposed faces of the block 13, disposed in planes substantially perpendicular to its thickness dimension, are shown provided with a pair of oppositely disposed conducting electrodes 16 and 17, and a pair of similarly oppositely disposed faces of the block 14 with a pair of oppositely disposed conducting electrodes 18 and 19. The electrodes 16, 17, 18 and 19 should preferably cover the entire faces to which they are respectively attached, except for narrow margins all around. The pairs of electrodes 16, 17 and 18, 19 may be connected, in series or parallel, by means of lead lines 21 and 22, and 23 and 24, to an electric system 20, in a manner well known. The electric system 20 may, for example, be a detecting circuit, the response of which is proportionate to the intensity of the particular vibration or acceleration involved of the base 12, or it may be a servo system.

The electric system does not normally impress any voltage upon the vibrators 13 and 14 from an outside source of voltage. The vibrators 13 and 14 are therefore normally in a state of rest. The same results would, however, be obtained if the vibrators were kept normally in a state of strain or motion by some external agency.

These piezoelectric vibrators may consist of a type that responds electrically when compressed, or alternatively of a type that responds electrically when sheared.

I consider the latter case first. The shear effect in the vibrators is realized when the base 12 is vibrated or accelerated in a predetermined direction, which is here the direction of the arrow in FIG. 2. (The case in which the base 12 is vibrated or accelerated parallel to AD is considered later.) The electric potential due to shear is also parallel to the arrow, so that potential differences are generated between the electrodes, thereby actuating the detecting circuit 20.

The preferred vibrator or sensor elements 13 and are piezoelectric, either natural or artificial. Piezoelectric materials are especially adapted for use in this invention. Crystals belonging to several crystallographic classes, as well as prepolarized ferroelectric ceramics, can be used as sensing elements. It is customary, in the case of the ceramics, to call the axis of prepolarization the Z-axis, the X- and Y- crystallographic axes being in any two mutually perpendicular direction at right angles to it. The necessary and sufficient condition is that each element shall be so oriented with respect to the crystallographic axes, and so mounted in the frame, that it will respond to substantially one component only of motion of the frame, but not to the other two components, all piezoelectric shear coefficients of each vibrator that could cause electric response to motion in directions at right angles to the said direction having values equal to zero. In other words, each element should become strained, thereby to generate an electromotive force therein, in response to stress exerted upon it in substantially the predetermined direction or substantially a direction opposite thereto only. As explained below, various kinds of crystal, including both quartz and ferroelectric ceramic, which are in common use for many piezoelectric purposes, may be used in the devices herein described. The invention is not, however, restricted to the use of piezoelectric materials.

According to the embodiment of the invention that is illustrated by FIG. 1, the pair of electrodes 16 and 17, and the pair of electrodes 18 and 19, are shown disposed in parallel planes. They accordingly operate alike to produce potential differences or electric polarizations of the same polarity in response to like vibrations of the vibrator or sensing element 13 and 14. It is preferred, furthermore, to employ a particularly efficient piezoelectric crystal or other vibrator or sensing element, so cut or otherwise designed as to utilize its shearing strains.

FIG. 1 also illustrates the use of compression instead of shear in exciting the piezoelectric elements 13 and 14. In this case, the accelerating motion is in the direction AC, so that one element becomes compressed while the other is extended. The resulting potential difference between the electrodes 16 and 17, and 18 and 19, can be combined either in series or parallel. To avoid having the elements respond also by shear to accelerations at right angles to the desired direction, the piezoelectric material used for the elements must, as explained below, be devoid of those shear-coefficients that would lead to such disturbances. Response in a single direction only is thus secured.

Returning to operation by shear, if the frame 12 is accelerated to the left, along a predetermined direction substantially at right angles to the line connecting the oppositely disposed parts of the base to which the outer ends of the blocks 13 and 14 are fastened, as indicated by the arrow in FIG. 2, the two vibrator or sensor-element blocks 13 and 14 become sheared transversely to the right, in the plane of the lines AB and AC, and conversely. When the base 12 vibrates to the right and the left in the direction AB, at any given frequency, the blocks 13 and 14 undergo alternating shears at the same frequency, thereby producing an alternating potential difference, between the pair of electrodes 16 and 17, and also the pair of electrodes 18 and 19.

The terms shear and compression are well known in the art, as explained, for example, in my book on Piezoelectricity (Dover Publications, Inc., New York, 1964), pages 46–52, particularly with reference to FIG. 14, on page 52. They may be defined as follows:

A shear is the type of strain in which a rectangle becomes deformed into an oblique parallelogram, without change in length of the sides. A compression, or its opposite, an extension, is the type of strain in which a rectangle subjected to a force in the direction of its length suffers a change in length. A pure compression is a compression that is free from shear or flexure.

Figure 7:
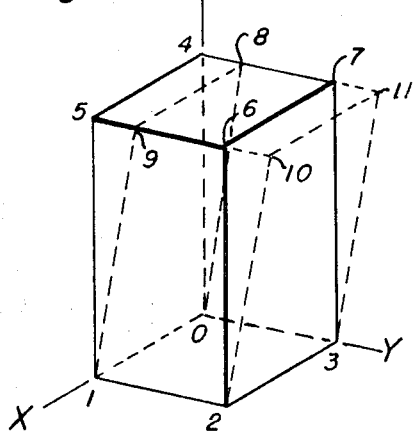
FIG. 7 is a diagrammatic view explanatory of certain phases of piezoelectric shear.

The nature of a shear is illustrated in FIG. 7, in which the rectangular block 0-1-2-3-4-5-6-7 is deformed by a shear into the shape 0-1-2-3-8-9-10-11.

As disclosed more particularly in my copending application, Ser. No. 496,345, filed Oct. 15, 1965, which, on Feb. 27, 1965, matured into U.S. Letters Patent No. 3,371,234, and in my said book on Piezoelectricity, pages 187, 190–192, when a piezoelectric crystal of the most general type is strained in any one of the six possible ways, it becomes electrically polarized. The polarization has components $P_1$, $P_2$, $P_3$ parallel to the X-, Y- and Z-axes of the crystal. The general equation is $P_m = e_{mh}S_h$, where $m = 1, 2$, or $3$, and $h = 1, 2, \ldots 6$. $e_{mh}$ is one of the 18 piezoelectric stress-coefficients; $S_h$ is a component of strain. Nine of these are compression coefficients, and the other nine correspond to shear.

These nine shear coefficients form the following matrix:

$$\begin{matrix} e_{14} & e_{15} & e_{16} \\ e_{24} & e_{25} & e_{26} \\ e_{34} & e_{35} & e_{36} \end{matrix}$$

In all but the triclinic hemihedral class, some of the coefficients vanish. The first subscript of e indicates the direction of the polarization of the bodies parallel to the respective X-, Y-, and Z- axes; the second subscript indicates the type of strains in the YZ-, ZX-, and XY- planes, respectively. They occur in the matrix shown above, and are the ones that play a part in those embodiments of this invention in which shearing effects are employed.

Figure 3:
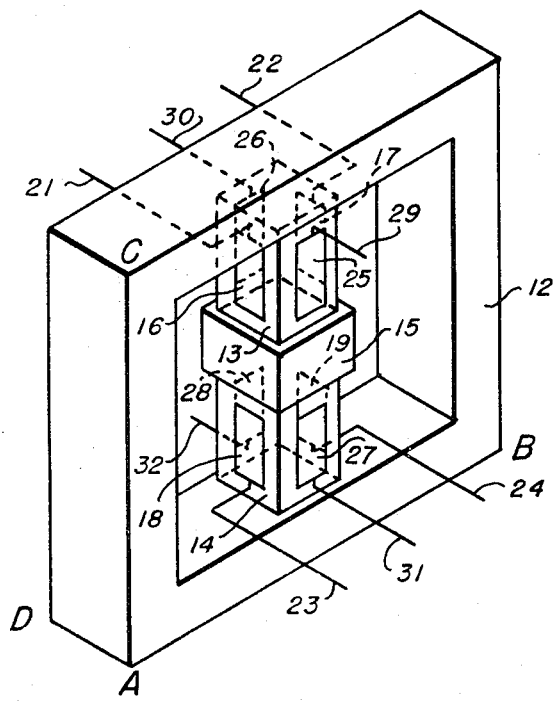
FIG. 3 is a view similar to FIG. 1 of a modification, designed for two-way sensing in two planes at right angles to each other.

To meet the requirements of the present invention as represented in FIG. 3, for two-way shear, the piezoelectric coefficients employed must be in the said matrix in different rows and columns, and the two corresponding shearing strains must be in planes each of which contains the length of the block; that is, neither plane can be allowed to be the plane of the cross-section of the block.

Since, as stated, the two piezoelectric coefficients employed lie in different rows and columns, they lie on the diagonal of a submatrix of the matrix shown above. In order to meet the conditions of the present invention, it is evident that the two coefficients on the other diagonal of the same submatrix must both equal zero. The length of each vibrator should be parallel to the intersection of the planes specified by the two values of h that are employed.

The principle can be understood best by considering the following example. Suppose we have a crystal with two piezoelectric coefficients $e_{15}$ and $e_{24}$. We cut from the crystal a bar having its length parallel to Z, and its width and thickness parallel to X and Y. Then when the bar is sheared mechanically in the ZX-plane, a polarization $P_1 = e_{15}S_5$ will be produced. Similarly a shear in the YZ-plane will produce a polarization $P_2 = e_{24}S_4$. These data apply, not only to conventional piezoelectric crystals, but also to other piezoelectric bodies, such as to ferroelectric ceramic of barium titanate or similar material polarized in the Z-direction.

The case in which $P_2 = e_{24}S_4$ applies to a piezoelectric black of square cross-section, such as may be represented by FIGS. 1 to 6, fastened at one end to the frame 12, with its length in the crystallographic Z-direction. For definiteness, the said end of the block 14, shown at 0-1-2-3 in FIG. 7, may be assumed to be fastened to the base 12 in the XY-plane. The faces 0-1-5-4 and 2-3-7-6 may be the faces covered with the conducting electrodes 18 and 19.

It will be noted that the two coefficients $e_{15}$ and $e_{24}$ lie on a diagonal of a submatrix. This is one of the basic requirements. Another is that the coefficients $e_{25}$ and $e_{14}$, on the other diagonal of the same submatrix, shall both equal zero.

In general it can be said that the choice of piezoelectric material is governed by the following requirements. In order to make the case general, we will assume that it is proposed to make use of a crystal having a piezoelectric shear coefficient $e_{mh}$, where $m$ specifies the direction of the electric field or polarization and may have the value of 1, 2, or 3, and $h$ specifies the type of strain, and may be equal to 4, 5 or 6. In the first place, the block must have its thickness parallel to $m$, and its electrodes on faces perpendicular to $m$. In the second place, the length of the block must be at right angles to $m$ and in the plane of shear specified by $h$.

In my book, I have divided the shear-type crystals into two groups $L_s$ and $T_s$.

For the $L_s$ group, the available shear-coefficients are listed in the following table, arranged according to classes. The general symbol for the coefficient is $e_{mh}$, where $m$, having the value 1, 2 or 3, corresponding to the respective crystallographic X-, Y- or Z- axis, represents the direction of the cyrstallographic axis along which the vibrator becomes polarized in response to vibration or acceleration, and $h$, which indicates the type of shear, has the value $m + 3$, or 4, 5 or 6, corresponding to shear in the YZ-, ZX- and XY-planes, respectively. The $L_s$ group is restricted to the coefficients $e_{14}$, $e_{25}$ and $e_{36}$, where $m$ has the value one, two or three, and in each case $h$ equals $m + 3$. In the following table, in which the classes available for one-way operation are listed, $l$, $t$ and $d$ respectively denote the directions of length, thickness and breadth, which last is the predetermined direction. The symbols, which are those of the wellknown Hermann-Mauguin system, are shown on page 19 of my book.

| $e_{mh}$ | $l$ | $t$ | $d$ | Classes |
|---|---|---|---|---|
| $e_{14}$ | Y | X | Z | 2, $\bar{4}$, 4, $\bar{4}2m$, 6, 622, 422, 222, 23 and $\bar{4}3m$. |
| $e_{14}$ | Z | X | Y | $\bar{4}2m$, 32, 622, 422, 32, 222, 23 and $\bar{4}3m$. |
| $e_{25}$ | X | Y | Z | 2, $\bar{4}$, 4, $\bar{4}2m$, 6, 622, 422, 222, 23 and $\bar{4}3m$. |
| $e_{25}$ | Z | Y | X | $\bar{4}2m$, 32, 622, 422, 32, 222, 23 and $\bar{4}3m$. |
| $e_{36}$ | X | Z | Y | 222, 23, $\bar{4}3m$ and $\bar{4}2m$. |
| $e_{36}$ | Y | Z | X | 222, 23, $\bar{4}3m$ and $\bar{4}2m$. |

Using these piezoelectric classes, 2, 222, $\bar{4}$, 4, $\bar{4}2m$, 422, 32, 6, 622, 23 and $\bar{4}3m$, no disturbing effects will be introduced into the operation.

According to this table, one crystallographic axis is that along the $m$-direction. This is the crystallographic axis around which the vibrator becomes sheared in response to vibration or acceleration; it is perpendicular to the predetermined direction and to the planes of the electrodes 16, 17 or 18, 19, referring, for example, to FIG. 1. The predetermined direction is now at right angles to the arrow and parallel to AD in FIG. 2. One of the dimensions of each vibrator, illustrated as the length dimension in the various figures, is parallel to the line connecting the opposite parts of the base to which the outer ends of the vibrators 13 and 14 are fastened, and to a second of the crystallographic axes of the vibrator. A second dimension of each vibrator, illustrated in the drawings as the thickness dimension, is parallel to said one crystallographic axis, along the $m$-direction, and at right angles to the said length dimension and to the predetermined direction. A third dimension of each vibrator, illustrated in the drawings as the breadth dimension, is parallel to the predetermined direction and to the third crystallographic axis of the vibrator.

For example, if $m = 1$ and $h = 4$, the coefficient is $e_{14}$. The length of the vibrator can be parallel to the said connecting line and to a second crystallographic axis, in this case the Y-axis, the thickness parallel to the X-axis and perpendicular to the said length and to the predetermined direction, which is along Z, and the breadth parallel to the third crystallographic axis of the vibrator. The length can also be parallel to Z, in which case the predetermined direction must be Y, the X-axis remaining unchanged. Alternatively, the coefficient $e_{25}$ can be used, the length of the vibrator being parallel to the said line and to a second crystallographic axis, the thickness of the vibrator being parallel to the Y-crystallographic axis and perpendicular to the said length and to the predetermined direction, the breadth of the vibrator being parallel to the third crystallographic axis.

For the $T_s$ group, the available shear-coefficients are listed in the following table. The symbols $e_{mh}$, $l$, $t$ and $d$ have the meaning explained above; for the $T_s$ group, the available coefficients are $e_{15}$, $e_{16}$, $e_{24}$, $e_{26}$, $e_{34}$ and $e_{35}$.

| $e_{mh}$ | $l$ | $t$ | $d$ | Class |
|---|---|---|---|---|
| $e_{15}$ | Z | X | Y | $mm2, 4mm, 3m, 6mm$. |
| $e_{16}$ | Y | X | Z | $3m$. |
| $e_{24}$ | Z | Y | X | $mm2, 4mm, 6mm, 3m$. |
| $e_{26}$ | X | Y | Z | $6, \bar{6}m2$. |
| $e_{34}$ | Y | Z | X | $m$. |
| $e_{35}$ | X | Z | Y | $m$. |

Using these piezoelectric classes $mm2$, $4mm$, $3m$, $6mm$, $\bar{6}$, $\bar{6}m2$ and $m$, no disturbing effects will be introduced into the operation.

According to this last table, one crystallographic axis is that around which the vibrator becomes sheared. One of the dimensions of each vibrator, illustrated as the length dimension in the various figures, is parallel to the line connecting the opposite parts of the base to which the outer ends of the vibrators 13 and 14 are fastened, and to a second of the crystallographic axes of the vibrator. This second crystallographic axis is parallel to the planes of the electrodes 16, 17 or 18, 19, referring, for example, to FIG. 1. A second dimension of each vibrator, illustrated in the drawings as the breadth dimension, is parallel to said one crystallographic axis, and perpendicular to the said length dimension and to the predetermined direction. A third dimension of each vibrator, illustrated in the drawings as the thickness dimension, is parallel to the predetermined direction and to the third crystallographic axis of the vibrator.

It will be noted that, in this last table, the second subscript of each coefficient has the value of $h$ equal to 4, 5 or 6, but exclusive of the value $m + 3$. Thus, in the case of $e_{15}$ and $e_{16}$, $h$ equals 5 or 6, but not $m + 3$, which is $1 + 3$, or 4. The thickness $t$ is parallel to the crystallographic axis along the $m$-direction.

For example, class $6mm$ includes the ferroelectric ceramics, for which class the lengths of the vibrators are parallel to the Z-axis, which is taken as the direction of prepolarization. If it is desired to obtain a shear response by means of $e_{15}$, the length of the vibrator should be parallel to Z and therefore at right angles to the predetermined direction of acceleration, its thickness (the direction of the electric field) parallel to X, and its breadth parallel to Y; and the accelerating force in the predetermined direction should also be applied parallel to X.

Similarly, using $e_{24}$, the length is disposed parallel to the Z-axis at right angles to the predetermined direction, the breadth parallel to the X-axis, and the thickness parallel to the Y-axis and to the predetermined direction. As stated above, the X- and Y- crystallographic axes may be in any two mutually perpendicular directions at right angles to the said prepolarized Z-axis.

The list of crystal classes $mm2$, 4, $4mm$, 3, $3m$, 6, $6mm$, $\bar{6}m2$ and $m$ contained in the following table are suitable for applying the compressional effect. All the cases listed are free from disturbing shear. The subscripts $m$ and $h$ may each have the value 1, 2 or 3. The first subscript $m$ of the coefficient designates the direction of polarization, which is also the direction of the thickness of the block; the second, $h$, designates the type of strain, which is a compression along one crystallographic axis and along the line connecting the parts of the base to which the outer ends of the vibrators 13 and 14 in FIG. 1, for example, are fastened. Numbers 1, 2, 3 refer to compression parallel to X, Y and Z, respectively, these letters also designating the length of the block which is also the predetermined direction of acceleration. Therefore, for the compressional effect, $h$ has the value 1, 2 or 3.

From the statements above and the following table, it is evident that when one axis has been chosen as the predetermined direction of compression, which is also the direction of the line between the opposite parts of the base to which the outer ends of the vibrators are fastened, the length of the vibrator is parallel to the said line and to the predetermined direction. The breadth is parallel to a second crystallographic axis and perpendicular to the predetermined direction and to the length. The thickness is parallel to the third crystallographic axis and perpendicular to the predetermined direction.

| Coeff. | $l$ | $t$ | $d$ | Classes |
|---|---|---|---|---|
| $e_{12}$ | Y | X | Z | $\bar{6}m2$. |
| $e_{13}$ | Z | X | Y | $m$. |
| $e_{21}$ | X | Y | Z | $3m$. |
| $e_{23}$ | Z | Y | X | $m$. |
| $e_{31}$ | X | Z | Y | $mm2, 4, 4mm, 3, 3m, 6, 6mm$. |
| $e_{32}$ | Y | Z | X | $mm2, 4, 4mm, 3, 3m, 6, 6mm$. |

For example, if a response to compression is to be attained by use of the coefficient $e_{31}$ in a crystal belonging to Class $6mm$, which includes the ceramics, the length of the vibrator should be parallel to X and to the predetermined direction, the thickness parallel to the prepolarized axis Z, and the breadth parallel to Y. Alternatively, for this same Class $6mm$, the coefficient $e_{32}$ may be used, in which case the length is parallel to Y and to the predetermined direction, thickness parallel to Z, and breadth parallel to X.

For two-way operation, as illustrated, for example, by FIG. 3, the following crystals are suitable, selected from the tables above. They are the crystals that have a pair of equal shear coefficients on the diagonal of a submatrix, the coefficients on the other diagonal being equal to zero.

|  | Classes |
| --- | --- |
| $e_{14}$ and $e_{25}$ | $\overline{4}2m$, 422, 32, 622, 23, and $\overline{4}3m$. |
| $e_{25}$ and $e_{36}$ | 23, $\overline{4}3m$. |
| $e_{14}$ and $e_{36}$ | 23, $\overline{4}3m$. |
| $e_{15}$ and $e_{24}$ | $4mm$, $6mm$, $3m$. |
| $e_{26}$ and $e_{35}$ | no classes. |
| $e_{16}$ and $e_{34}$ | no classes. |

Both in the case of quartz and ceramic, the length is parallel to the Z-axis, and the thickness and breadth parallel respectively to the X- and Y- axes. In the case of quartz, the vibrators are so oriented with respect to the inertial mass 15 that the Y-dimension of the vibrator lies in the direction of motion of the inertial mass, so that when the mass vibrates, the vibrators will become sheared in the YZ- plane and a potential difference will be produced between electrodes at the ends of the X- axis.

In the case of the ceramic, the same statement holds except that it is the X- direction that lies in the direction of motion and the plane of shear is the ZX- plane.

It is assumed throughout that all piezoelectric coefficients and directions of cut are taken with respect to the standard crystal axes. However, the same theoretical treatment would apply if the coefficients were expressed with reference to a set of transformed axes X', Y', Z', in which case the coefficients in the said matrix would have a different set of values.

When transformed axes are used the piezoelectric coefficients $e_{mh}$ have different values, which may be designated by $e'_{mh}$. The subscripts $m$ and $h$ have the same meaning as with the original axes. For example, a transformed cut might be selected that had a coefficient $e'_{15}$. The subscripts 1 and 5 have the same meaning and the same values as if $e_{15}$ for an untransformed crystal were used.

The thickness is taken as along the line connecting the electrodes, and the breadth as perpendicular to this line and to the line connecting the opposite parts of the base to which the outer ends of the vibrators are fastened.

These described two-way shearing effects can be realized, as shown above, in crystals belonging to the following nine classes: $\overline{4}2m$, 422, $4mm$, 32, $3m$, 622, $6mm$, 23 and $\overline{4}3m$. Fortunately, they include all the species of piezoelectric crystals that are of importance at present. The following may be named, together with the pairs of piezoelectric coefficients that would be used for realizing the purposes of this invention: ammonium and potassium phosphates ($e_{14}$ and $e_{25}$); quartz ($e_{14}$ and $e_{25}$); tourmaline ($e_{15}$ and $e_{24}$); and ceramic ($e_{15}$ and $e_{24}$).

In order to realize the necessary and sufficient conditions mentioned above, care must be taken that there is no electrical excitation of the piezoelectric elements due to the presence of other piezoelectric coefficients in the same row (that is, with the same value of $m$) as the one that it is desired to use. Such excitation can occur in several classes of cyrstals that otherwise would be suitable for use in the present invention. Consider first the devices that can operate by shear, as illustrated in FIGS. 1 to 7. In FIG. 1, for example, if the acceleration to be sensed is parallel to AB, then if an acceleration parallel to AC were to occur it would cause one of the elements 13 and 14 to be compressed lengthwise, the other extended. If the selected crystal has a compressional coefficient $e_{mh}$ ($h = 1, 2,$ or 3) that causes electrical excitation for compression or extension in the length direction, then when a response is observed it will be impossible to tell whether it is due to acceleration parallel to AC or AB. Such disturbing effects can occur in crystals belonging to seven of the piezoelectric classes, namely, 1, 2, $m$, $\overline{4}$, 3, 32 and $\overline{6}$. Moreover, in some cases, there may be, in the said matrix of shears, one or two additional non-vanishing coefficients in the same horizontal row as that which it is desired to employ. One of these coefficients is always such as to cause a shear in the cross-section of the bar, and it is not a source of error. The other coefficient causes the bar to respond electrically to an acceleration at right angles to that which is desired. This effect can occur in crystals belonging to seven piezoelectric classes, namely, 1, 2, $\overline{4}$, 4, 3, 32 and 6.

Figure 5:
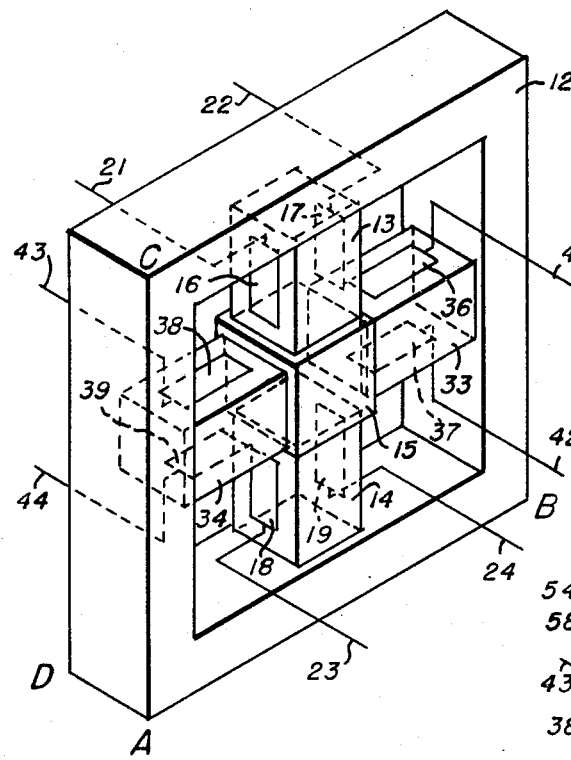
FIG. 5 is a view similar to FIGS. 1, 3 and 4, illustrating another embodiment of the invention, designed for two-way sensing.
Figure 6:
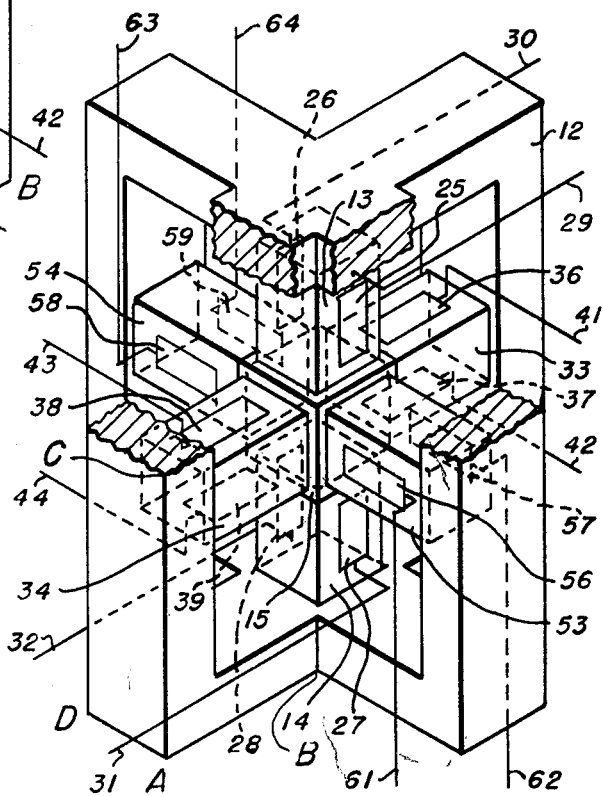
FIG. 6 is a similar view of an embodiment of the invention designed for three-way sensing, in three mutually perpendicular planes.

Consider next the devices that can operate by compression. In FIGS. 1, 5 and 6, if the desired response is to acceleration parallel to AC, then an acceleration in either direction at right angles to AC will cause a shear in the blocks. If the proposed crystal has one or both of the corresponding shear coefficients of finite value, such coefficients will cause electrical excitation in one or both directions at right angles to the desired one. Such disturbing effects can occur in the following eleven piezoelectric classes: 1, 2, 222, $\overline{4}$, $\overline{4}2m$, 422, 32, $\overline{6}$, 622, 23, and $\overline{4}3m$. The thickness of the elements should be sufficiently great to insure that the strain will be substantially a compression.

In order to avoid the aforementioned sources of error, and to accomplish the objects of this invention, one should avoid the use of crystals possessing the undesired coefficients. It should be borne in mind, however, that a coefficient which has a disturbing effect for one cut and length-direction, from a particular crystal class, may not cause disturbance for a different cut and length from the same class. Moreover, it may be possible to eliminate any disturbing coefficient by the use of a rotated cut resulting from a transformation of the standard crystallographic axes.

The essentials of the above are that for shear devices, for the same $m$, there must be no shear coefficient that can cause response to acceleration or vibration in any direction at right angles to the length and to the predetermined direction of the desired response, and also no coefficient that can cause response to acceleration or vibration parallel to the length; and, for compressional devices, for the same $m$, there must be no shear coefficient that can cause response to acceleration or vibration in any direction at right angles to the predetermined direction of the desired response ($h = 4, 5$ or 6).

When the foregoing conditions are complied with, the device will respond to mechanical vibration or acceleration of the base in substantially the predetermined direction or substantially a direction opposite thereto only.

Under these conditions, operation will occur, in the one case, under conditions of shear, if the vibrators have a thickness sufficiently great so that they will undergo a simple shear when their inner ends move with respect to the base, thereby to generate an electromotive force therein, in response to stress exerted upon them in substantially the predetermined direction or substantially a direction opposite thereto only; and, in the other case, under conditions of pure compression, if they have a thickness sufficiently great so that they will undergo pure compression when their inner ends move with respect to the base, thereby to generate an electromotive force therein, in response to stress exerted upon them in substantially the predetermined direction or a direction substantially opposite thereto only.

If a piezoelectric quartz crystal is used with one pair of electrodes, it may be of the type described in the said Letters Patent, with its length dimension substantially parallel to an X axis, and with the breadth and thickness dimensions disposed substantially +13° with respect to the to the Z and Y axes, respectively, hereinafter called the Y'- cut.

The overall length of the alined piezoelectric blocks 13 and 14 and the inertial mass 15 may be as low as mechanical and electrical considerations will permit, bearing in mind, however, that as this overall length is decreased, the internal impedance becomes increased. The mass of the inertial member 15 may be quite large in comparison with that of either of the piezoelectric blocks 13 and 14. It is quite practicable to use blocks of length 0.2 centimeter or less, so that the overall length of the two blocks and the inertial mass is of the order of half a centimeter or less.

According to the embodiment of the invention that is illustrated by FIG. 5, the base 12 responds simultaneously and independently, with the aid of two further vibrator or sensor elements 33 and 34, to two mutually perpendicular components of the motion, in the directions of the lines AB and AC, translating each of these components into electrical signals; and, according to the embodiment of the invention that is illustrated by FIG. 6, vibration or acceleration of the base 12 in a third direction A D, at right angles to A B and A C, is provided for, with the aid of two still further vibrators 53 and 54.

The invention is adaptable for use, therefore, not only in a single direction of vibration or acceleration of the base, but also for the use of two or three independent electrical signals from the three components of any acceleration or vibration in space to which the device may be subjected.

Referring to the embodiment of the invention that is illustrated by FIG. 3, which is adapted for the use of mechanical vibrations in either or both of two directions at right angles to each other, the piezoelectric blocks 13 and 14 are provided, not only with the respective pairs of oppositely disposed pairs of electrodes 16 and 17 and 18 and 19, but also, on the faces at right angles thereto, with further respective pairs of oppositely disposed pairs of electrodes 25 and 26, and 27 and 28, disposed at right angles to the respective pairs of electrodes 16 and 17, and 18 and 19. The electrodes 25 and 26 are connected to a suitable electric system of the above-described character, not shown, in series or parallel, by leads 29 and 30, and the electrodes 27 and 28 by leads 31 and 32. In addition to the vibrator or accelerator response or sensing in the left-right direction that is provided for by the embodiment of the invention that is illustrated by FIGS. 1 and 2, in the plane of the lines AB and AC (motion parallel to AB), therefore, the embodiment of the invention that is illustrated by FIG. 3 provides also for response or sensing in a second plane, the plane of the lines AC and AD (motion parallel to AD), at right angles to the plane of the lines AB and AC, corresponding to motion of the base in the direction AD. A shear at right angles to the plane of the lines AB and AC, in the second-named plane, the plane of the lines AC and AD, produces the same effect, between the pair of electrodes 25 and 26, and the pair of electrodes 27 and 28, that has been described above, but in the said second plane of the lines AC and AD, at right angles to the first-named plane, which is that of the lines AB and AC.

If the enclosing base 12 shown in FIG. 3 vibrates in two directions simultaneously, parallel to the lines AB and AD, respectively, two alternating currents will be produced, one in the electric system connected to the electrodes 16, 17 and 18, 19, and the other in the electric system connected to the electrodes 25, 26 and 27, 28.

One of these alternating currents, between the pairs of electrodes 16 and 17 and 18 and 19, is proportional to the component of vibration of the vibrator or sensing elements 13 and 14 in one direction, while the other alternating current, between the pairs of electrodes 25 and 26 and 27 and 28, is proportional to the component at right angles thereto.

The sensing elements 13 and 14 are so designed, therefore, that a shear in one direction causes a potential difference between the pairs of electrodes 16 and 17 and 18 and 19, while a shear at right angles to the said one direction causes a potential difference between the other pairs of electrodes 25 and 26 and 27 and 28. These shear effects operate independently of each other, for the reason now to be explained.

It is a property of certain crystals that they respond electrically to shears in two mutually perpendicular planes, the response in either plane being independent of the shear in the other plane. In the embodiment illustrated in FIG. 3, mechanical vibration 2 base parallel to either AB or AD will cause shear in the planes CAB and CAD, respectively.

Figure 4:
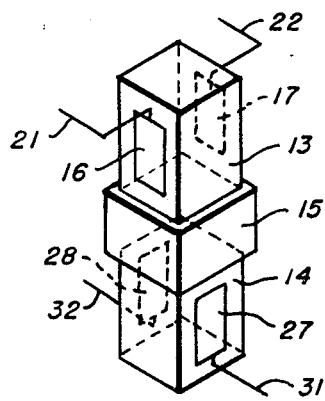
FIG. 4 is a fragmentary view similar to FIGS. 1 and 3 of a further modification.

It is also possible, as illustrated by FIG. 4, to use two vibrator or sensing elements having axes substantially at right angles, each of which responds to shear in one direction only. In this case, each element 13 and 14 has one pair of electrodes 16 and 17 and 27 and 28, the upper element 13 being so oriented as to respond to one component of motion, while the lower element 14 responds to the component at right angles to the first.

The two-way and three-way embodiments of the invention that are illustrated by FIGS. 5 and 6 operate on the principle of either shear or compression.

Referring to the two-way embodiment of this invention that is illustrated by FIG. 5, the base 12 has attached to its inner surface four sensing elements instead of only two, as in FIGS. 1 to 4, inclusive. Two of these, numbered 33 and 34, are in addition to the before-mentioned sensing blocks 13 and 14, and each is provided with one pair of electrodes, which may likewise be connected in any desired way, as series or parallel. The vibrator or sensing element 33 is shown provided with the pair of oppositely disposed electrodes 36 and 37, and the vibrator or sensing element 34 is shown provided with the pair of oppositely disposed electrodes 38 and 39. The electrodes 36 and 37 are shown provided with lead lines 41 and 42, and the electrodes 38 and 39 with lead lines 43 and 44.

The four vibrator or sensing elements 13, 14, 33 and 34 are shown disposed in two alined pairs at right angles to each other, namely, the alined pair 13 and 14, and the alined pair 33 and 34. The outer ends of the vibrator or sensing elements of each pair 13, 14 and 33, 34 are fastened to opposite parts of the base 12. The two lines joining the said parts of the base corresponding to each pair are thereby disposed substantially at right angles to each other. In FIG. 5, these two lines are the lines along which the sensing elements 13 and 14 and the sensing elements 33 and 34 are alined.

The inertial member 15 is fastened to the inner ends of these sensing elements 13, 14 and 33 and 34.

One pair of the oppositely disposed elements, say, the pair 13 and 14, will respond to vibration or acceleration of the base 12 parallel to AB, while the other pair, the elements 33 and 34, will respond to vibration or acceleration parallel to AC. The piezoelectric properties of the elements 13, 14, 33 and 34 must be such that none of these four elements will respond to vibration or acceleration in the direction AD, at right angles to the plane of the lines AB and AC.

When the sensing elements for the two-way device shown in FIG. 5 are of piezoelectric material, the device can be made to respond either to compression or to shear, depending on the choice of material and cut.

Each of the four elements 13, 14, 33 and 34 may, on the one hand, be of such nature as to respond electrically to a shear in the plane of the lines AB and AC, but not to a compression. On the other hand, each of the elements 13, 14, 33 and 34 may be such as to respond electrically to a compression in the direction of its length, that is, in the direction of the line AB or AC, but not to a shear.

If the elements 13, 14, 33 and 34 respond to a shear, then, if the base 12 is accelerated to the right or left, parallel to the line AB, the elements 13 and 14 become sheared, while the elements 33 and 34 are inactive. Or, if the base 12 is accelerated parallel to the line AC, the elements 33 and 34 are sheared, while the elements 13 and 14 are inactive. All the elements are inactive with respect to motion in the direction AD, at right angles to the lines AB and AC.

The shear effect in quartz is suitable, making use, for example, of the equation $P_1 = e_{14} S_4$. Each sensing element in FIG. 5 then has its length parallel to the Z-axis of the crystal and its electrodes on the faces of the crystal that are parallel to the plane of the lines AB and AC. The X-axis of the crystal is at right angles to the electrodes, that is, at right angles to the plane of the lines AB and AC.

If the vibrator or sensing elements respond to compression, then, if the base 12 is accelerated parallel to AB in FIG. 5, the elements 33 and 34 respond electrically, while the elements 13 and 14 are inactive. When the base 12 is accelerated parallel to AC, the elements 13 and 14 respond electrically, while the elements 33 and 34 are inactive. The necessary and sufficient condition is that the element shall respond electrically to compression parallel to its length, but not to a shear in any plane containing its length.

When ceramic material is used for two-way sensing, as illustrated, for example, by FIG. 5, each element can be made to respond to compression by having it polarized in a direction perpendicular to its length; this direction of prepolarization is the Z-direction. In FIG. 5, for the elements 33 and 34, this Z-direction is parallel to AC, and the electrodes 36, 37, 38 and 39 are on the faces parallel to AB and at right angles to AC; the lengths of these elements 33 and 34, parallel to AB, are taken as along the X-axis. The electric polarization due to compression in the direction parallel to AB is then $P_3 = e_{31}S_1$. Similarly for the elements 13 and 14, the Z-direction is parallel to AB, and the X-direction is parallel to AC. The equation for polarization in the AC-direction is, as before, $P_3 = e_{31}S_1$. When the frame 12 is accelerated parallel to AB, the elements 13 and 14 become sheared, but the piezoelectric constants of the ceramic are such that this shear produces no electric response and is therefore not a source of error; and, similarly, for acceleration parallel to AC.

By having each ceramic sensing element prepolarized in the direction of its length, which is now the Z-axis, instead of at right angles thereto, the device shown in FIG. 5 is made shear-sensitive instead of pressure-sensitive. Either the X-axis or the Y-axis may be considered as lying in the plane of the figure. If the X-axis is so chosen, the operating equation is $P_1 = e_{15}S_5$; if the Y-axis lies in the plane of the figure, the operating equation is $P_2 = e_{24}S_4$.

The coefficients $e_{15}$ and $e_{24}$ are equivalent, owing to the fact, as stated above, that the X- and Y- axes of the ceramics may be in any two mutually perpendicular directions at right angles to the Z- axis and therefor interchangeable. For the class to which the ceramics belong, these represent the same identical piezoelectric structure, the difference in notation resulting from the rotation of the crystal through 90°.

According to the three-way embodiment of this invention that is illustrated by FIG. 6, all three components of acceleration or vibration, in any direction in space, can be sensed. The construction and method of operation are like those in FIG. 5, but with the addition of a third pair of sensing elements 53 and 54, the inner ends of which, like those of the sensing elements 13, 14, 33 and 34, are attached to the inertial slab 15. The inertial slab 15, therefore, may be in the form of a cube. In addition to the four sides shown in FIGS. 1 to 5, the base 12 is shown in FIG. 6 provided with two more sides, alined at right angles to, and respectively on opposite sides of, the frame shown in FIGS. 1, 2, 3, and 5. 3

The outer ends of the vibrator or sensing elements 53 and 54 are fastened to the inner faces of these additional sides of the base 12.

In this arrangement of FIG. 6, therefore, three alined pairs of vibrator or sensing elements are provided, with the outer ends of each pair fastened to the base 12. The lines joining the opposite parts of the base 12 corresponding to the respective pairs are disposed substantially at right angles to one another.

Vibration or acceleration of the base 12 in any one of the three directions in space, whether a simple acceleration or a vibration in this direction, therefore, is sensed by one pair of the three pairs of sensing elements 13 and 14, 33 and 34 and 53 and 54, while the other two pairs of these sensing elements are unresponsive to this component of vibration or acceleration. The sensing elements 53 and 54 are each shown provided with a pair of electrodes 56 and 57, and 58 and 59, respectively. These electrodes 56, 57, 58 and 59 are shown provided, respectively, with lead lines 61, 62, 63 and 64.

In this three-way device, represented in FIG. 6, the shearing effect may be used and the sensing elements may be of quartz. Each element, 13, 14, 33, 34, 53 and 54, for example, is so oriented that its length, in the direction at right angles to the surface of the base 12 to which it is attached, is parallel to the crystallographic Z-axis. Its thickness, which is at right angles to the length and to the direction of vibration or acceleration of the base 12, is parallel to the crystallographic X-axis. All electrodes are located at the ends of X-axes. The operating equation is $P_1 = e_{14}S_4$. In FIG. 6, the sensing elements 13 and 14 have their X-axes parallel to AD at right angles to the plane of the lines AB and AC, and become sheared in that plane when the acceleration is parallel to AB. The elements 33 and 34 have their X-axes parallel to AC, and their shear is in a plane at right angles to AC when the acceleration is at right angles to the plane of the lines AB and AC.. The sensing elements 53 and 54 have their X-axes parallel to AB, and the shear is in a plane at right angles to AB, when the accleration is parallel to AC.

Alternatively, the Y-' cut mentioned above can be used. In this case, the length is parallel to the crystallographic X- axis, its thickness in a direction substantially 13 degrees from the crystallographic Y- axis and parallel to the predetermiend direction, and its breadth in a direction substantially 13 degrees from the crystallographic Z- axis.

The use of a ferroelectric ceramic in the three-way device of FIG. 6 will now be explained. Two methods are possible. In the first of these, the compressional effect is employed, the equation being $P_3 = e_{31}S_1$. The length of each sensing element is parallel to the X-axis, and the thickness, which is in the direction of acceleration, is parallel to the Z-axis, along which the ceramic is prepolarized. The electrodes are at the ends of the Z-axis. The pairs of sensing elements 13 and 14, 33 and 34, and 53 and 54 respond respectively to vibration or acceleration parallel to AC, parallel to AB, and perpendicular to the plane of the lines AB and AC.

In the second method for the three-way ceramic device that is illustrated by FIG. 6, the shearing effect is employed, the equation being $P_1 = e_{15}S_5$. The length of each sensing element is at right angles to the two attached surfaces of the base 12, and is the prepolarized Z-axis. The thickness direction, which is the same as the direction of vibration or acceleration, is parallel to the X-axis. The pairs of sensing elements 13 and 14, 33 and 34, and 53 and 54 respond respectively to vibration or acceleration at right angles to the plane of the lines AB and AC, parallel to AC, and parallel to AB.

Figure 12:
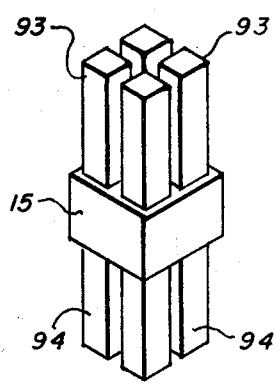
FIG. 12 is a view similar to FIG. 1, of an embodiment employing multiple vibrators.

Instead of two thick blocks, a number of thinner blocks or bars 93 and 94 can be assembled side by side in stacks, as illustrated by FIG. 12. This assembly of thin blocks, firmly bound together, constitutes, and operates in effect as, a single vibrator, or the equivalent thereof. The location of the electrodes follows the same rules as in the case of the single vibrators illustrated.

In all embodiments of this invention in which compression is used, the active elements are not restricted to the piezoelectric types hereinbefore described, but may consist of any one of a large number of transducers of the pressure-sensitive type already known to the art, including various types of microphone, or operating on the principle of magnetostriction or electrostatics.

It has been stated above that, if the $e$ coefficients were expressed with reference to a set of transformed axes, they would have a different set of values, say, $e'$. These $e'$ coefficients are equivalent to the $e$ values discussed above, since they are functions thereof. Whether expressed in terms of the $e$ coefficients or the $e'$ coefficients, therefore, the same piezoelectric structure is represented thereby. It is not necessary, therefore, to repeat the theoretical treatment in terms of the $e$ coefficients in order to write down the equivalent expressions in terms of the $e'$ coefficients. It is accordingly to be understood that the claims express the same structure, even though worded in the terms of the e coefficients only, without express reference to the corresponding $e'$ coefficients.

Figure 8:
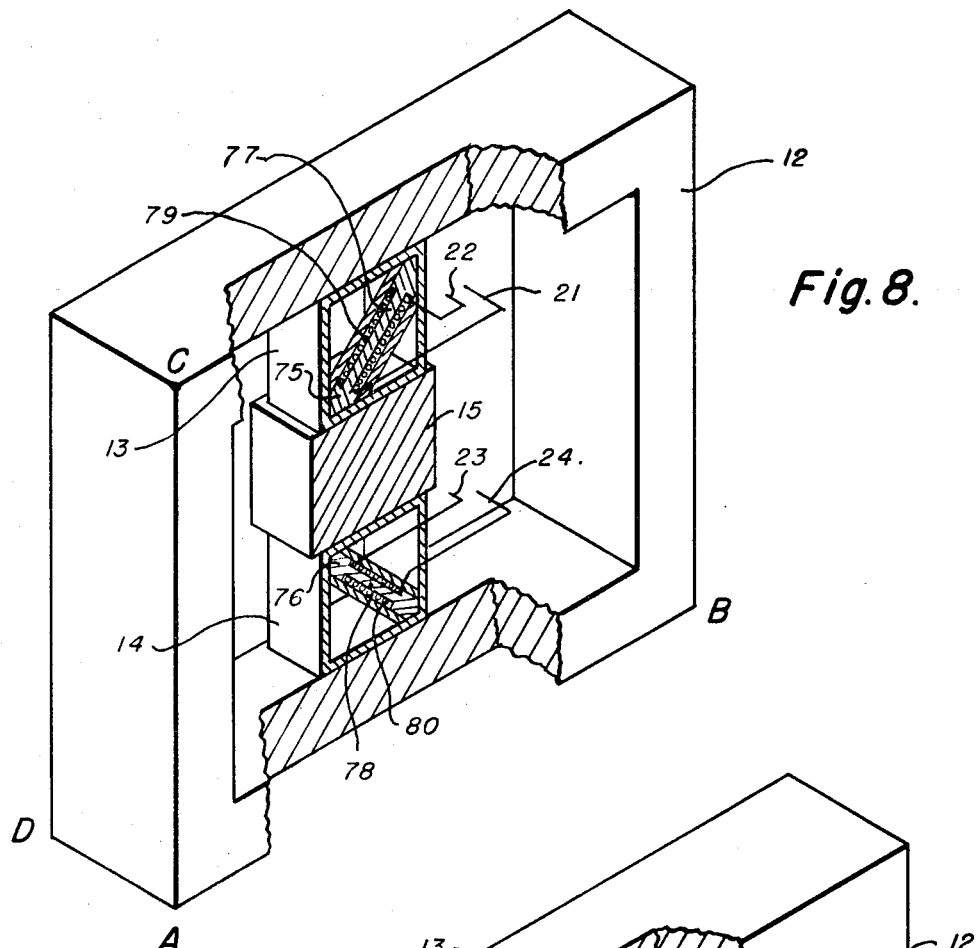
FIG. 8 is a view, partly broken away, similar to FIG. 1, of a device embodying the present invention, employing magnetostrictive vibrators.

FIG. 8 shows in schematic form two magnetostrictive vibrators 13 and 14 fastened inside a rectangular frame 12, their inner ends being fastened to an inertial slab 15. The sides of the frames that are at right angles to AB are sufficiently rigid to prevent appreciable compression in the AC-direction, but the frames are flexible in the plane of AB and AC. 75 and 76 are members of suitable ferromagnetic material having central cores 77 and 78, around which are wound coils 79 and 80 of insulated wire. When alternating electric current from an external source is supplied to the coils, the cores become magnetized. Through the well-known magnetostrictive effect a lengthwise compression or extension of the cores produces a change in the degree of magnetization, which in turn modifies the impressed current. The ferromagnetic members are mounted inside the flexible vibrator frames 13 and 14 at oblique angles, preferably of 45° with the sides of the frames. Thus when the base is vibrated or accelerated in the direction AB in FIG. 8, both ferromagnetic members become lengthened or shortened by a small amount, thereby modifying the currents in the two coils, which may be connected in series or parallel. Motion of the base in the directions AC and AD causes no response.

Figure 9:
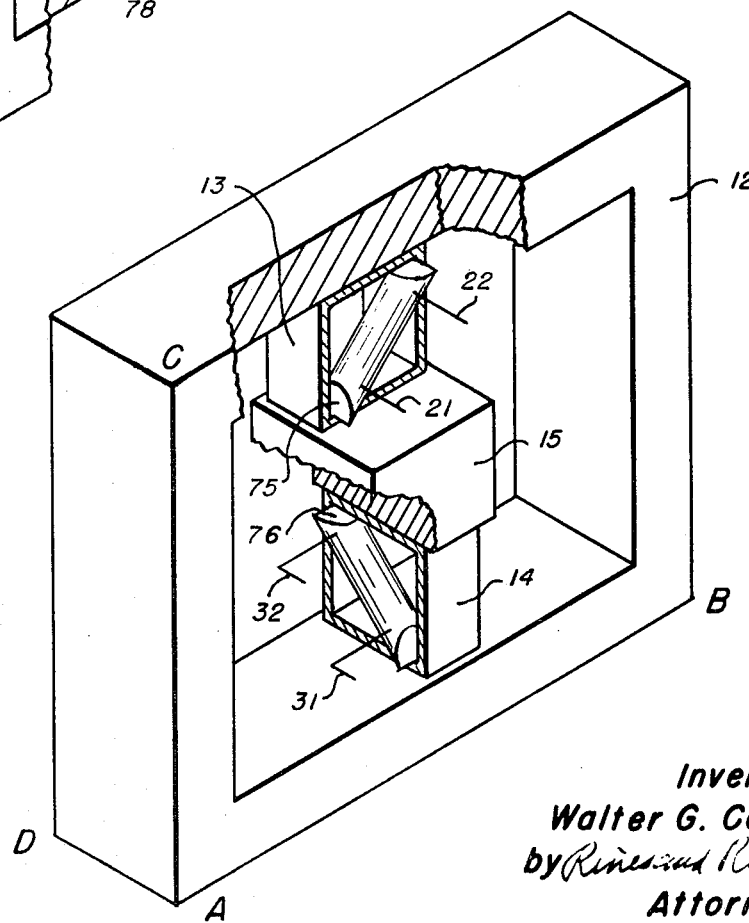
FIG. 9 is a view, similar to FIG. 4, of a modification of the same.

FIG. 9 discloses a modification of FIG. 8, in which the magnetostrictive vibrator 14 is represented as rotated 90° about its length axis, so as to respond to motion of the base in the direction at right angles to its length and to the line AB. The two coils 79 and 80 are now connected to two separate electric circuits. By this construction, a response is obtained from vibration or acceleration independently in either of two directions at right angles, parallel to AB and AD.

Figure 10:
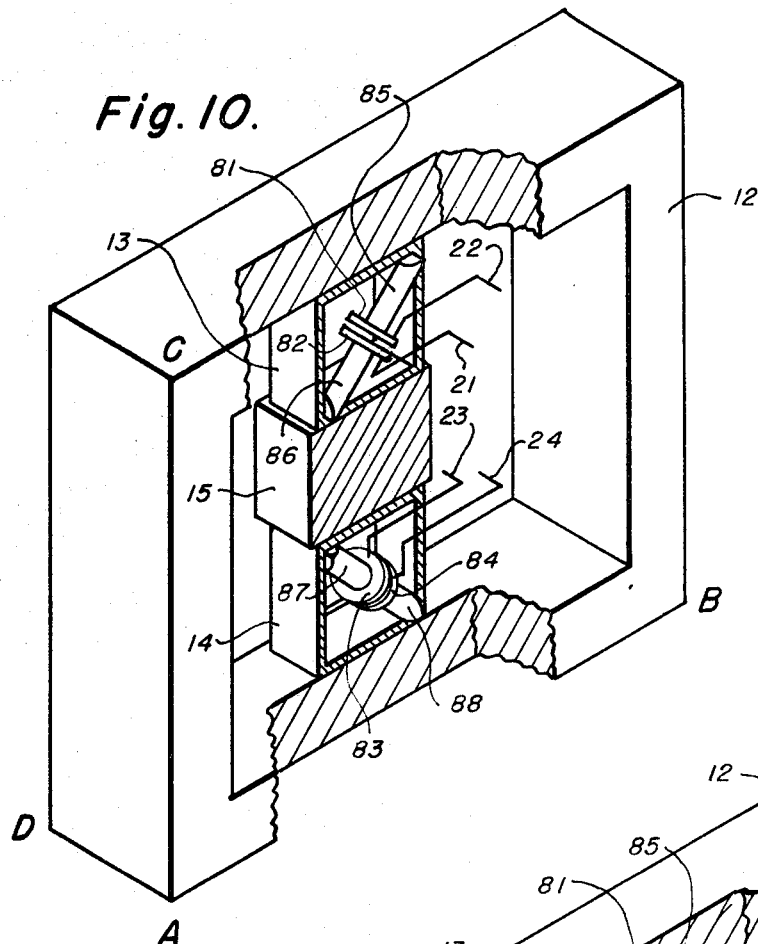
FIG. 10 is a view similar to FIG. 8 of a device employing capacitor vibrators.

FIG. 10 shows in schematic form two capacitive vibrators 13 and 14 fastened inside a rectangular frame 12, their inner ends being fastened to an inertial slab 15. 81, 82 and 83, 84 are two pairs of condenser plates, the distances between which are controlled by the rods 85, 86, 87 and 88. These rods are mounted at oblique angles, preferably of 45° in the vibrator frames 13 and 14. The sides of the frames that are at right angles to AB are sufficiently rigid to prevent appreciable compression in the AC-direction, but the frames are flexible in the plane of AB and AC. The two pairs of condenser plates may be connected in series or parallel, and the combination connected to an external circuit so designed, by well-known methods, as to respond electrically to small changes in capacitance of the two condensers 81, 82 and 83, 84. These changes in capacitance are brought about by vibration or acceleration of the base 12 in the direction AB, FIG. 10. If, for example, the base is accelerated to the right, the inertial mass 15 will move to the left relatively to the base, the separation between the condenser plates 81, 82 and 83, 84, will be slightly increased, and the electric circuit will show a corresponding response. Motion of the base in the directions AC and AD causes no response. It will be observed that whereas, in the case of the piezoelectric embodiments of the invention, the electrical response to the stress excited in the vibrators is a generation of electromotive force therein, in the case of the magnetostrictive and capacitive modifications, it is a modification of the current impressed thereon.

Figure 11:
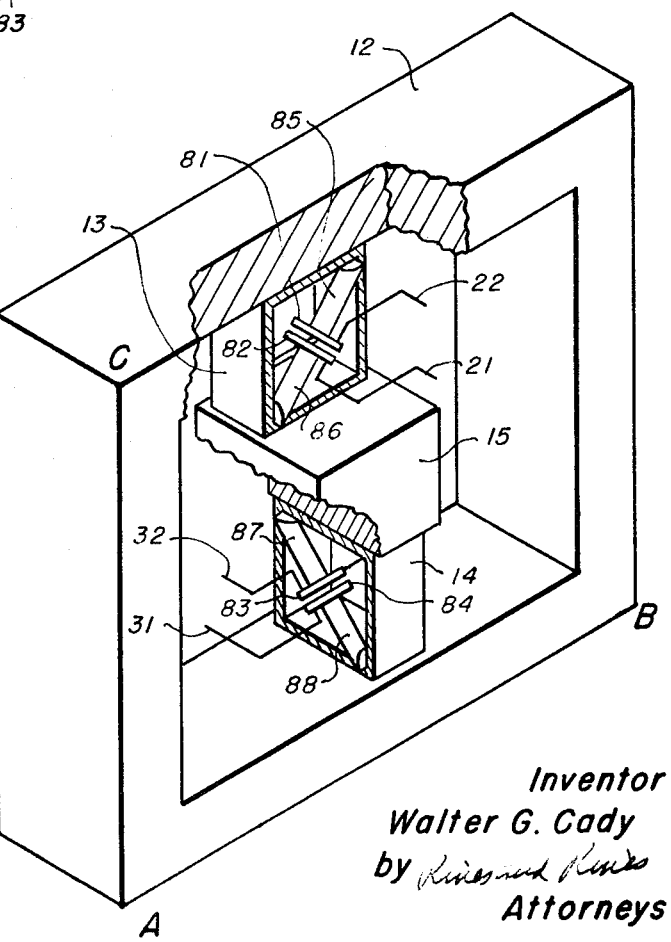
FIG. 11 is a view partly broken away, similar to FIG. 4, of a modification of the same.

FIG. 11 is a modification of FIG. 10, in which the capacitive vibrator 14 is represented as rotated 90° about its length axis, so as to respond to motion of the base in the direction at right angles to its length and to the line AB. The two pairs of capacitor plates 81, 82 and 83, 84, are now connected to two separate electric circuits. By this construction, a response is obtained from vibration or acceleration independently in two directions at right angles, parallel to AB and AD.

Further modifications will occur to persons skilled in the art and all such are considered to fall within the spirit and scope of the present invention, as defined in the appended claims. claims.

What is claimed is:

1. An instrument for responding to mechanical vibration or acceleration of a base along two predetermined directions at right angles to each other comprising two oppositely disposed electromechanical vibrators having inner and outer surfaces and having an inertial member rigidly fastened to the inner surfaces thereof, means including rigid fastenings between the outer surfaces of the vibrators and opposite parts of the base that are positioned along a line that is substantially at right angles to the predetermined directions for causing the inner surfaces of the vibrators to move simultaneously with respect to the base in either of two directions substantially at right angles to each other, or in a direction opposite thereto, in response to vibration or acceleration of the base in one or the other of said predetermined directions, or in a direction opposite thereto, and to generate corresponding electrical response in at least one of the vibrators independent of vibration or acceleration of said base in any other direction, and means for detecting said responses, respectively.

2. An instrument for responding to mechanical vibration or acceleration of a base along a predetermined direction comprising two oppositely disposed piezoelectric vibrators having inner and outer surfaces and having an inertial member rigidly fastened to the inner surfaces of the vibrators, each of the vibrators having one crystallographic axis of shear, means including rigid fastenings between the outer surfaces of the vibrators and opposite parts of the base that are positioned along a line that is substantially at right angles to said predetermined direction for causing each vibrator to become sheared around its said axis of shear in response to vibration or acceleration of said base in said predetermined direction or the opposite direction and to produce an electrical polarization substantially independent of vibration or acceleration of said base in any other direction, a first dimension of each vibrator being parallel to the said line and to a second of the crystallographic axes of the vibrator, a second dimension of each vibrator being parallel to the said one crystallographic axis and perpendicular to the first dimension and to the predetermined direction, a third dimension of each vibrator being parallel to the predetermined direction and to the third crystallographic axis of the vibrator, each vibrator being provided with electrodes perpendicular to its said second dimension, the piezoelectric vibrators being selected from the group consisting of the crystallographic classes 2, 222, $\bar{4}, 4, \bar{4}2m$, 422, 32, 6, 622, 23 and $\bar{4}3m$, and means coupled to the electrodes of said vibrators for detecting said electrical polarizations.

3. An instrument for responding to mechanical vibration or acceleration of a base along a predetermined direction comprising two oppositely disposed piezoelectric vibrators having inner and outer surfaces and having an inertial member rigidly fastened to the inner surfaces of the vibrators, each of the vibrators having one crystallogrphic axis of shear, means including rigid fastenings between the outer surfaces of the vibrators and opposite parts of the base that are positioned along a line that is substantially at right angles to said predetermined direction for causing each vibrator to become sheared around its said axis of shear in response to vibration or acceleration of said base in said predetermined direction or the opposite direction and to produce an electrical polarization substantially independent of vibration or acceleration of said base in any other direction, a first dimension of each vibrator being parallel to the said line and to a second of the crystallographic axes of the vibrator, a second dimension of each vibrator being parallel to the said one crystallographic axis and perpendicular to the first dimension and to the predetermined direction, a third dimension of each vibrator being parallel to the predetermined direction and to the third crystallographic axis of the vibrator, each vibrator being provided with electrodes perpendicular to its said third dimension, the piezoelectric vibrators being selected from the group consisting of the crystallographic classes $mm2$, $4mm$, $3m$, $6mm$, $\bar{6}m2$ and $m$, and means coupled to the electrodes of said vibrators for detecting said electrical polarizations.

4. An instrument for responding to mechanical vibration or acceleration of a base along a predetermined direction comprising two oppositely disposed piezoelectric vibrators having inner and outer surfaces and having an inertial member rigidly fastened to the inner surfaces of the vibrators, each of the vibrators having one crystallographic axis along which the vibrator may become compressed, means including rigid fastenings between the outer surfaces of the vibrators and opposite parts of the base that are positioned along a line that is substantially parallel to said predetermined direction for causing one vibrator to become compressed and the other to become extended along its said axis in response to vibration or acceleration of said base in said predetermined direction or the opposite direction and to produce an electrical polarization in each vibrator substantially independent of vibration or acceleration of said base in any other direction, a first dimension of each vibrator being parallel to the said line and to the predetermined direction, a second dimension of each vibrator being parallel to a second crystallographic axis and perpendicular to the predetermined direction and to the first dimension, and a third dimension of each vibrator being parallel to the third crystallographic axis of the vibrator and perpendicular to the predetermined direction, the piezoelectric vibrators being selected from the group consisting of the crystallographic classes $mm2$, 4, $4mm$, 3, $3m$, 6, $6mm$, $\bar{6}m2$ and $m$, and means for detecting said electrical polarizations.

5. An instrument for responding to mechanical vibration or acceleration of a base selectively along either of two mutually perpendicular predetermined directions comprising two pairs of oppositely disposed piezoelectric bodies having inner and outer surfaces, the bodies having an inertial member rigidly fastened to the inner surfaces thereof, means including rigid fastenings between the outer surfaces of the bodies of each pair and opposite parts of the base that are positioned along lines perpendicular, respectively, to said predetermined directions and perpendicular to each other for causing the bodies of one pair or the other to become electrically polarized, when shearing stresses are exerted selectively upon the bodies of one or the other pair in substantially the corresponding one or the other of the predetermined directions or a direction substantially opposite thereto only, in response to vibration or acceleration of the base in the said one or the other of the predetermined directions or the said substantially opposite direction only, and substantially independent of vibration or acceleration of said base in any other direction, and means for detecting the polarizations, respectively.

6. An instrument for responding to mechanical vibration or acceleration of a base selectively along any one of three mutually perpendicular predetermined directions comprising three pairs of oppositely disposed piezoelectric bodies having inner and outer surfaces, the bodies having an inertial member rigidly fastened to the inner surfaces thereof, means including rigid fastenings between the outer surfaces of the bodies of each pair and opposite parts of the base that are positioned along lines perpendicular, respectively, to said predetermined directions and perpendicular to each other for causing the bodies of one pair or another to become electrically polarized, when shearing stresses are exerted selectively upon the bodies of one or another pair in substantially the corresponding one or another of the predetermined directions or a direction substantially opposite thereto only, in response to the vibration or acceleration of the base in the said one or another of the predetermined directions or the said substantially opposite directions only, and substantially independent of vibration or acceleration of said base in any other direction, and means for detecting the polarizations, respectively.

7. An instrument for responding to mechanical vibration or acceleration of a base along a predetermined direction comprising two oppositely disposed piezoelectric vibrators having inner and outer surfaces and having an inertial member rigidly fastened to the inner surfaces of the vibrators, each of the vibrators having one crystallographic axis along which the vibrator may become compressed, means including rigid fastenings between the outer surfaces of the vibrators and opposite parts of the base that are positioned along a line that is substantially parallel to said predetermined direction for causing one vibrator to become compressed and the other to become extended along its said axis in response to vibration or acceleration of said base in said predetermined direction or the opposite direction and to produce in each vibrator an electrical polarization subantially independent of vibration or acceleration of said base in any other direction, one of the dimensions of each vibrator being parallel to the said line and to the predetermined direction, a second of the dimensions of each vibrator being aprallel to a second crystallographic axis and perpendicular to the predetermined direction and to the said one dimension, and the third dimension of eahc vibrator being aprallel to the third crystallographic axis of the vibrator and perpendicular to the predetermined direction, the thickness of each vibrator being great enough to assure that the vibrations of said vibrators shall be substantially a pure compression, and means for detecting said electrical polarizations.

8. An instrument for responding to mechanical vibration or acceleration of a base along two predetermined directions at right angles to each other comprising two oppositely disposed piezoelectric vibrators having inner and outer surfaces and having an inertial member rigidly fastened to the inner surfaces thereof, the vibrators each having a pair of oppositely disposed electrode faces respectively provided with electrodes, one pair of electrode faces being disposed at right angles to one of the predetermined directions and the other pair at right angles to the other predetermined direction, means including rigid fastenings between the outer surfaces of the vibrators and opposite parts of the base that are positioned along a line that is substantially at right angles to the predetermined directions for causing the inner surfaces of the vibrators to move simultaneously with respect to the base transversely along substantially two single directions only that are respectively parallel to the said predetermined directions in response to vibration or acceleration of the base along the respective predetermined directions, and to generate electromotive forces in the respective vibrators between the corresponding electrodes, and means coupled to said electrodes for detecting said electromotive forces, respectively.

9. An instrument for responding to mechanical vibration or acceleration of a base along two predetermined directions at right angles to each other comprising two oppositely disposed piezoelectric vibrators having inner and outer surfaces and having an inertial member rigidly fastened to the inner surfaces thereof, the vibrators each having two pairs of oppositely disposed electrode faces respectively provided with electrodes, the pairs being so disposed that each pair will respond to vibration or acceleration along one of the predetermined directions, means including rigid fastenings between the outer surfaces of the vibrators and opposite parts of the base that are positioned along a line that is substantially at right angles to the predetermined directions for causing the inner surfaces of the vibrators to move simultaneously with respect to the base transversely along substantially two single directions only that are respectively parallel to the said predetermined directions in response to vibration or acceleration of the base along the respective predetermined directions and to generate electromotive forces in the respective vibrators between the corresponding electrodes, and means coupled to said electrodes for detecting said electromotive forces, respectively.

10. An instrument for responding to mechanical vibration or acceleration of a base selectively along either of two mutually perpendicular predetermined directions comprising two pairs of oppositely disposed piezoelectric bodies, the bodies having inner and outer surfaces and having an inertial member rigidly fastened to the inner surfaces thereof, means including rigid fastenings between the outer surfaces of the bodies of each pair and opposite parts of the base that are positioned along lines parallel, respectively, to said predetermined directions and perpendicular to each other for causing the bodies of one pair or the other to become electrically polarized, when compressional stresses are exerted selectively upon the bodies of one or the other pair in substantially the corresponding one or the other of the predetermined directions or a direction substantially opposite thereto only, in response to vibration or acceleration of the base in the said one of the predetermined directions or the said substantially opposite direction only, and substantially independent of vibration or acceleration of said base in any other direction, and means for detecting the polarizations, respectively.

11. An instrument for responding to mechanical vibration or acceleration of a base selectively along any one of three mutually perpendicular predetermined directions comprising three pairs of oppositely disposed piezoelectric bodies, the bodies having inner and outer surfaces and having an inertial member rigidly fastened to the inner surfaces thereof, means including rigid fastenings between the outer surfaces of the bodies of each pair and opposite parts of the base that are positioned along lines parallel, respectively, to said predetermined directions and perpendicular to each other for causing the bodies of one pair or another to become electrically polarized, when compressional stresses are exerted selectively upon the bodies of one or another pair in substantially the corresponding one or another of the predetermined directions or a direction substantially opposite thereto only, in response to the vibration or acceleration of the base in the said one or another of the predetermined directions or the said substantially opposite direction only, and substantially independent of vibration or acceleration of said base in any other direction, and means for detecting the polarizations, respectively.

* * * * *